US012664479B2

(12) United States Patent
Almasan et al.

(10) Patent No.: US 12,664,479 B2
(45) Date of Patent: Jun. 23, 2026

(54) AUTOMATED DATA EXTRACTION AND ADAPTATION

(71) Applicant: American Express Travel Related Services Company, Inc., New York, NY (US)

(72) Inventors: Rares Ioan Almasan, Phoenix, AZ (US); Rebecca L. Henry, Phoenix, AZ (US); Rahul Menon, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/392,858

(22) Filed: Dec. 21, 2023

(65) Prior Publication Data

US 2024/0127117 A1 Apr. 18, 2024

Related U.S. Application Data

(63) Continuation of application No. 16/267,013, filed on Feb. 4, 2019, now Pat. No. 11,886,958.

(51) Int. Cl.
| | |
|---|---|
| *G06N 20/00* | (2019.01) |
| *G06N 5/04* | (2023.01) |
| *G06Q 30/018* | (2023.01) |

(52) U.S. Cl.
CPC ............... *G06N 20/00* (2019.01); *G06N 5/04* (2013.01); *G06Q 30/018* (2013.01)

(58) Field of Classification Search
None
See application file for complete search history.

(56) References Cited

PUBLICATIONS

Shi, et al., AIFORE: Smart Fuzzing Based on Automatic Input Format Reverse Engineering, Proceedings of the 32nd USENIX Security Symposium, Aug. 11, 2023, pp. 4967-4984 (Year: 2023).*
Liu, et al., Combined Speed and Steering Control in High-Speed Autonomous Ground Vehicles for Obstacle Avoidance Using Model Predictive Control, IEEE Transactions on Vehicular Technology, vol. 66, No. 10, 2017, pp. 8746-8763 (Year: 2017).

* cited by examiner

*Primary Examiner* — Wilbert L Starks

(57) ABSTRACT

Systems and methods for automated data extraction and adaptation are disclosed. The system may receive a data input from an external source using various different input channels. The system may determine a data quality of the data input by comparing data fields of the data input to known metadata in the system. The system may reformat the data input based on the comparison to a format consumable by downstream applications and services. The system may apply various machine learning operations on the data input including a descriptive analytics analysis, a predictive learning analysis, and/or a prescriptive intelligence analysis.

20 Claims, 4 Drawing Sheets

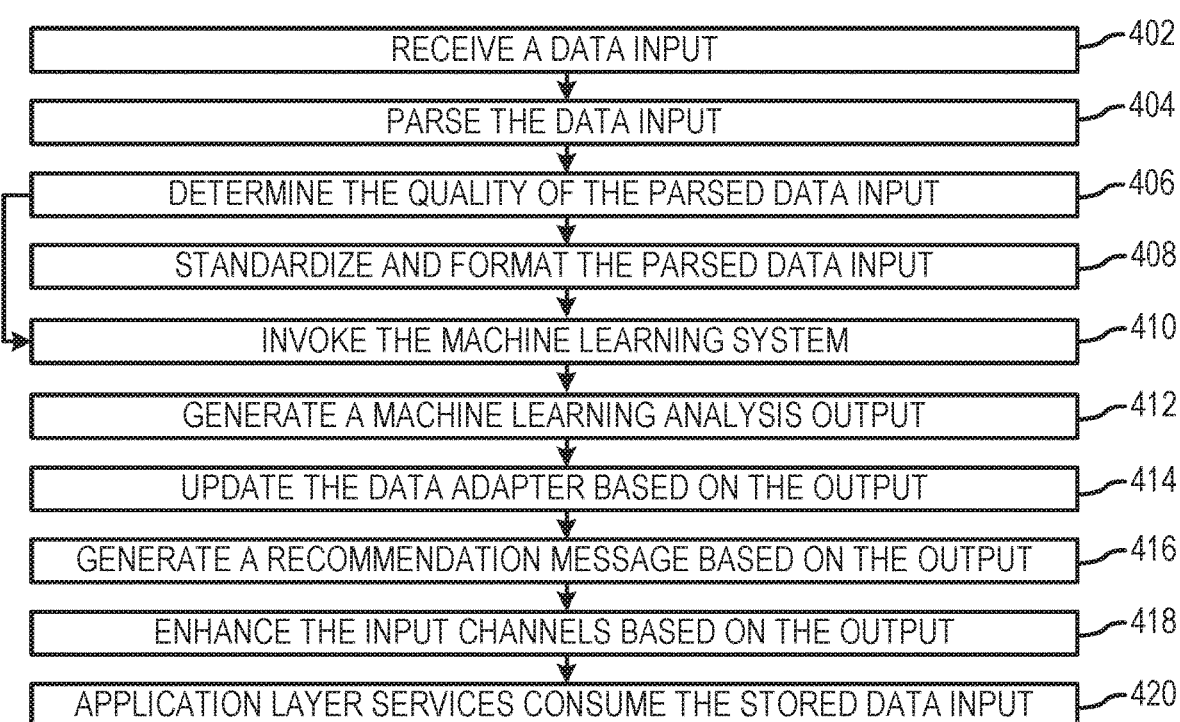

| | |
|---|---|
| RECEIVE A DATA INPUT | 402 |
| PARSE THE DATA INPUT | 404 |
| DETERMINE THE QUALITY OF THE PARSED DATA INPUT | 406 |
| STANDARDIZE AND FORMAT THE PARSED DATA INPUT | 408 |
| INVOKE THE MACHINE LEARNING SYSTEM | 410 |
| GENERATE A MACHINE LEARNING ANALYSIS OUTPUT | 412 |
| UPDATE THE DATA ADAPTER BASED ON THE OUTPUT | 414 |
| GENERATE A RECOMMENDATION MESSAGE BASED ON THE OUTPUT | 416 |
| ENHANCE THE INPUT CHANNELS BASED ON THE OUTPUT | 418 |
| APPLICATION LAYER SERVICES CONSUME THE STORED DATA INPUT | 420 |

FIG. 4

AUTOMATED DATA EXTRACTION AND ADAPTATION

FIELD

The disclosure generally relates to data processing, and more specifically, to systems and methods for automated data extraction and adaptation from data inputs received from external sources.

BACKGROUND

Business processes may rely on data from external sources in diverse formats, structures, and modes of integration. For example, financial institutions and transaction account issuers may need external merchants, vendors and marketplaces to provide business data and transaction data for the financial institution and transaction account issuer to comply with guidelines, regulations or legal requirements. The business processes usually need all data inputs to have a unified, specific data structure in order to be consumable by downstream platforms, applications, or systems. Typically, each external source is responsible for ensuring that the data inputs are provided in the necessary data structure. However, establishing systems, protocols, and structures to ensure compliance may require significant cost, technology and resource investment by the external source. Moreover, testing compliance between external sources and the business processes may be time and processing intensive, and may increase processing, memory, and bandwidth usage.

SUMMARY

Systems, methods, and articles of manufacture (collectively, the "system") for automated data extraction and adaptation are disclosed. The system may receive a data input from an input channel. The system may determine a data quality of the data input by comparing a data field of the data input to known metadata. The system may reformat the data input based on the comparison of the data input to the known metadata. The system may generate a machine learning analysis output based on the data input.

In various embodiments, the system may generate the machine learning analysis output by performing operations including: generating a descriptive analytics output in response to the data field of the data input comprising the known metadata; assessing the data input using a predictive learning analysis to determine a second data field of the data input that is not included in the known metadata; and generating the machine learning analysis output using a prescriptive intelligence analysis based on the descriptive analytics output and the predictive learning analysis. The system may enhance the input channel based on the machine learning analysis output. The system may generate a recommendation message based on the machine learning analysis output.

In various embodiments, the input channel may comprise an API input, a web service input, a web portal input, and/or a file feed input, and the data input may be received using middleware. The input channel may comprise a physical document input, and the data input may be received using optical character recognition (OCR). The input channel may comprise a speech input or a text input, and the data input may be received using at least one of a gateway or a natural language processing (NLP) module. The input channel may comprise an email input, and the data input may be received using at least one of an email webhook or the NLP module.

In various embodiments, the data input may comprise transaction data or merchant data, and reformatted data input may be consumed to comply with a know your customer (KYC) regulation, a financial risk rating, an anti-money laundering law, or a financial legal requirement.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 4 illustrates a process flow for a process of extracting and adapting data inputs from varying data channels, in accordance with various embodiments.

DETAILED DESCRIPTION

Systems for automated data extraction and adaptation are disclosed. Business processes and applications may rely on data inputs from various external sources. For example, financial institutions and/or transaction account issuers may need external merchants, vendors and marketplaces to provide data inputs used by the financial institution and transaction account issuer to comply with guidelines, regulations or legal requirements. As a further example, financial institutions and/or transaction account issuers may use the data input to comply with know your customer (KYC) regulations, financial risk ratings, anti-money laundering laws, and other legal requirements.

In various embodiments, the data inputs received from the external sources may comprise merchant data such as, for example, merchant name, merchant ID, merchant tax ID, merchant address, and/or the like. In various embodiments, the data inputs may comprise transaction data such as, for example, total transaction levels, spend levels of various transaction account owners, and/or similar financial or transaction-related data.

The system may enable external sources to transmit the data inputs without requiring a unified, specific data structure in order for the data inputs to be consumable by downstream platforms, applications, or systems. In that regard, external sources may transmit the data inputs in both structured or unstructured data formats, and via various data input channels (e.g., software, physical documents, speech, text, email, etc.). The system may be configured to extract data from the data inputs and adapt the data into a format consumable by downstream platforms, applications, or systems. For example, the system may implement a metadata-driven data adapter, a machine learning system, and a business intelligence system configured to aid in extracting and adapting the data inputs, as discussed further herein.

The system therefore provides a technical solution to the technical problem caused by typical business process systems using data inputs having unified, specified data structures in order to be consumable by downstream platforms. In that regard, the system may reduce the cost, technology, and resource investments typically used by external sources. Moreover, by at least partially reducing the testing time for compliance and setup between external sources and the system, the system may reduce time and processing needs, thus increasing processing, memory, and bandwidth efficiencies. The system may also reduce human involvement and the need for manual input during the setup process, thus decreasing the needed processing compared to typical systems requiring manual input.

Figure 1:
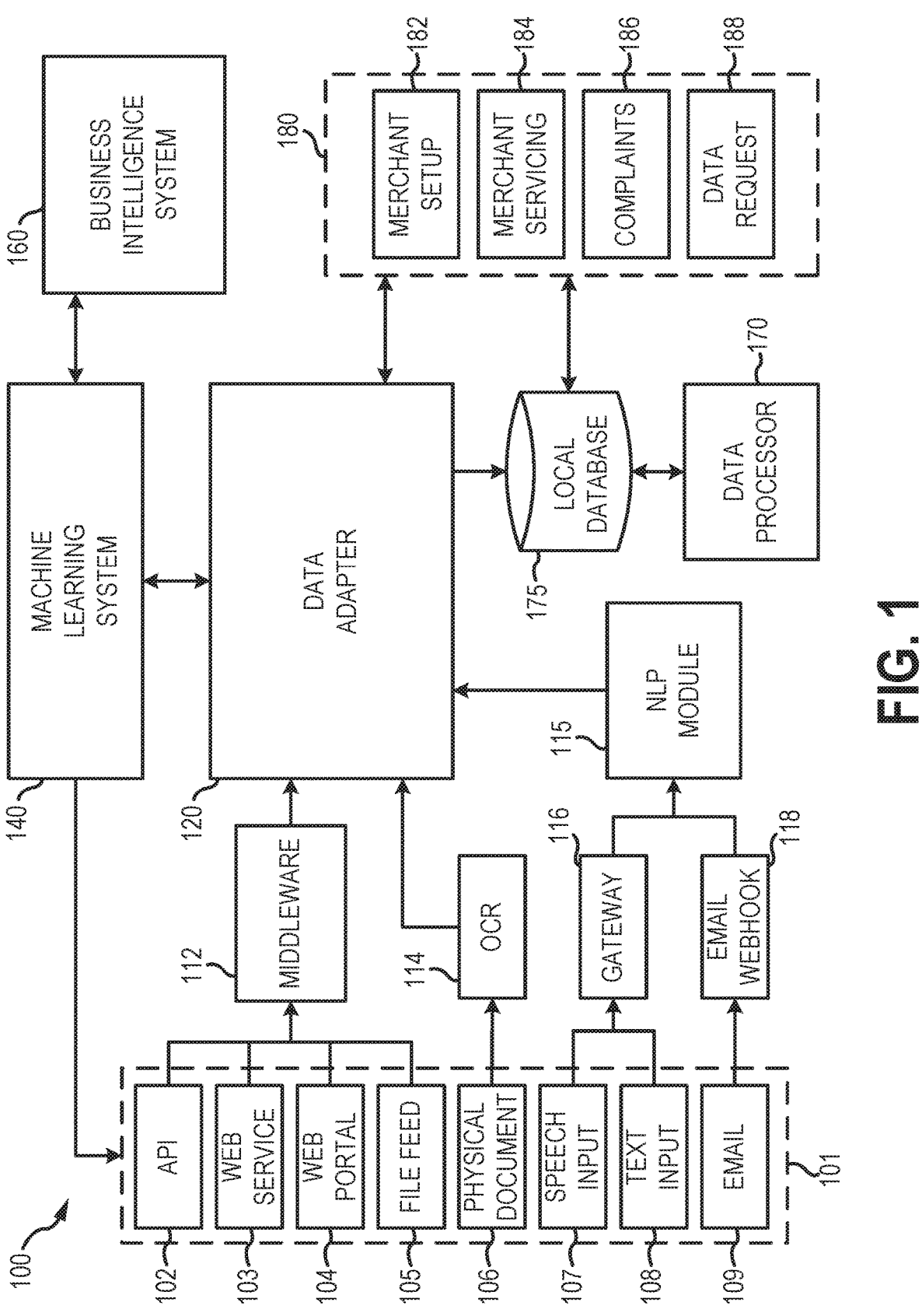
FIG. 1 is a block diagram illustrating various system components of a system for automated data extraction and adaptation, in accordance with various embodiments.

In various embodiments, and with reference to FIG. 1, a system 100 for automated data extraction and adaptation is disclosed. System 100 may receive data inputs from various input channels 101; process, extract, and adapt the data inputs via one or more data adapters 120, machine learning systems 140, and business intelligence systems 160; and/or provide the data inputs to various application layer services 180 in a data format and structure consumable by the services. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

System 100 may allow external sources to submit data inputs according to one or more input channels 101. In various embodiments, one or more input channels 101 may be different from other input channels 101, and may comprise different data structures, formats, and the like. In various embodiments, one or more input channels 101 may be similar to other input channels 101, and may comprise similar data structures, formats, and/or the like. Further, data inputs of the same type (e.g., email) transmitted by different external sources may also have different data structures, formats, or the like. In that regard, system 100 may enable external sources to submit the data inputs without requiring a specific format or structure in order for the data input to be processed, extracted, and adapted. For example, and in accordance with various embodiments, input channels 101 may comprise an application programming interface (API) input 102, a web service input 103, a web portal input 104, a file feed input 105, a physical document input 106, a speech input 107, a text input 108, an email input 109, and/or the like.

The data inputs from each input channel 101 may be fed into data adapter 120 directly or using various connector systems. For example, and in accordance with various embodiments, system 100 may implement middleware 112 configured to provide software applications and services, and/or to allow data adapter 120 to receive data inputs from API inputs 102, web service inputs 103, web portal inputs 104, and/or file feed inputs 105. Middleware 112 may include any hardware and/or software suitably configured to facilitate communications and/or process data inputs between input channels 101 and data adapter 120. Middleware components are commercially available and known in the art. Middleware 112 may be implemented through commercially available hardware and/or software, through custom hardware and/or software components, or through a combination thereof. Middleware 112 may reside in a variety of configurations and may exist as a standalone system or may be a software component integrated into data adapter 120. WEB SPHERE® MQ™ (formerly MQSeries) by IBM®, Inc. (Armonk, N.Y.) is an example of a commercially available middleware product. An Enterprise Service Bus ("ESB") application is another example of middleware.

As a further example, and in accordance with various embodiments, system 100 may implement optical character recognition (OCR) 114 configured to provide software applications and services, and/or to allow data adapter 120 to receive data inputs from various input channels 101, such as physical document inputs 106. OCR 114 may include any hardware and/or software suitably configured to facilitate communications and/or process data inputs between inputs channels 101 and data adapter 120. OCR 114 may be configured to receive a scanned document, an image of a document, or a similar text-based input from physical document input 106, and convert the types, handwritten, or printed text into machine-encoded text readable by data adapter 120. For example, and in accordance with various embodiments, OCR 114 may scan data inputs received from physical document input 106, scan the data input text character-by-character, analyze the scanned image, and translate the character image into character codes, such as ASCII or similar commonly used character codes in data processing. Optical character recognition components are commercially available and known in the art. OCR 114 may be implemented through commercially available hardware and/or software, through custom hardware and/or software components, or through a combination thereof. OCR 114 may reside in a variety of configurations and may exist as a standalone system or may be a software component integrated into data adapter 120.

As a further example, and in accordance with various embodiments, system 100 may comprise a gateway 116 configured to provide software applications and services, and/or to allow data adapter 120 to receive data inputs from various input channels 101, such as speech input 107 (e.g., voicemail, phone call, etc.) and/or text input 108 (e.g., chatbot chat, SMS, MMS, etc.). Gateway 116 may be configured to provide a link between speech input 107 and text input 108 and data adapter 120. For example, gateway 116 may act as a portal between inputs 107, 108 and data adapter 120, allowing the components to share information by using a standard protocol. Gateway components are commercially available and known in the art. Gateway 116 may be implemented through commercially available hardware and/or software, through custom hardware and/or software components, or through a combination thereof. Gateway 116 may reside in a variety of configurations and may exist as a standalone system or may be a software component integrated into data adapter 120.

As a further example, and in accordance with various embodiments, system 100 may comprise an email webhook 118 configured to provide software applications and services, and/or to allow data adapter 120 to receive data inputs (e.g., email) from email input 109. Email webhook 118 may be configured to receive data inputs from email input 109, parse the data input, and route the data input to data adapter 120. For example, email webhook 118 may comprise an HTTP callback function configured to route data inputs to data adapter 120 in response to system 100 receiving the data input from email input 109. Webhook components are commercially available and known in the art Email webhook 118 may be implemented through commercially available hardware and/or software, through custom hardware and/or software components, or through a combination thereof. Email webhook 118 may reside in a variety of configurations and may exist as a standalone system or may be a software component integrated into data adapter 120.

In various embodiments, data inputs received by gateway 116 and/or email webhook 118 may also be preprocessed prior to ingestion into data adapter 120. For example, system 100 may comprise a natural language processing (NLP) module 115. NLP module 115 may be configured to receive voice inputs, text-based inputs, or the like, and interpret, categorize, analyze, and transform the inputs into a standardized data input. NLP module 115 may comprise any suitable processing technique, model, algorithm, or the like configured to transform a natural language input into a standardized data input consumable by data adapter 120. For example, NLP module 115 may implement text processing, classification, speech-to-text, sentiment analysis, and/or similar processing capabilities. In various embodiments, NLP module 115 may also implement various text analysis processes such as, for example word frequency analysis tools, phrase frequency analysis tools, and/or any other suitable text mining algorithm, tool, or the like. Natural language processing components are commercially available and known in the art. NLP module 115 may be implemented through commercially available hardware and/or software, through custom hardware and/or software components, or through a combination thereof. NLP module 115 may reside in a variety of configurations and may exist as a standalone system or may be a software component integrated into data adapter 120, or gateway 116 and/or email webhook 118.

In various embodiments, data adapter 120 may be configured to receive data inputs from the data channels 101 either directly or via the connecting components (e.g., middleware 112, OCR 114, gateway 116, email webhook 118, NLP module 115, etc.). Data adapter 120 may be in electronic communication with machine learning system 140, local database 175, and/or one or more application layer services 180. Data adapter 120 may be configured to fetch and parse the data inputs, extract data from the data inputs, and adapt the extracted data into a data format consumable in system 100, as discussed further herein.

Data adapter 120 may comprise one or more hardware, software, and/or database components. For example, data adapter 120 may comprise one or more network environments, servers, computer-based systems, processors, databases, and/or the like. Data adapter 120 may comprise at least one computing device in the form of a computer or processor, or a set of computers/processors, although other types of computing units or systems may be used such as, for example, a server, web server, pooled servers, or the like. Data adapter 120 may also include software, such as services, APIs, and the like, configured to perform various operations discussed herein. In various embodiments, data adapter 120 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Figure 2:
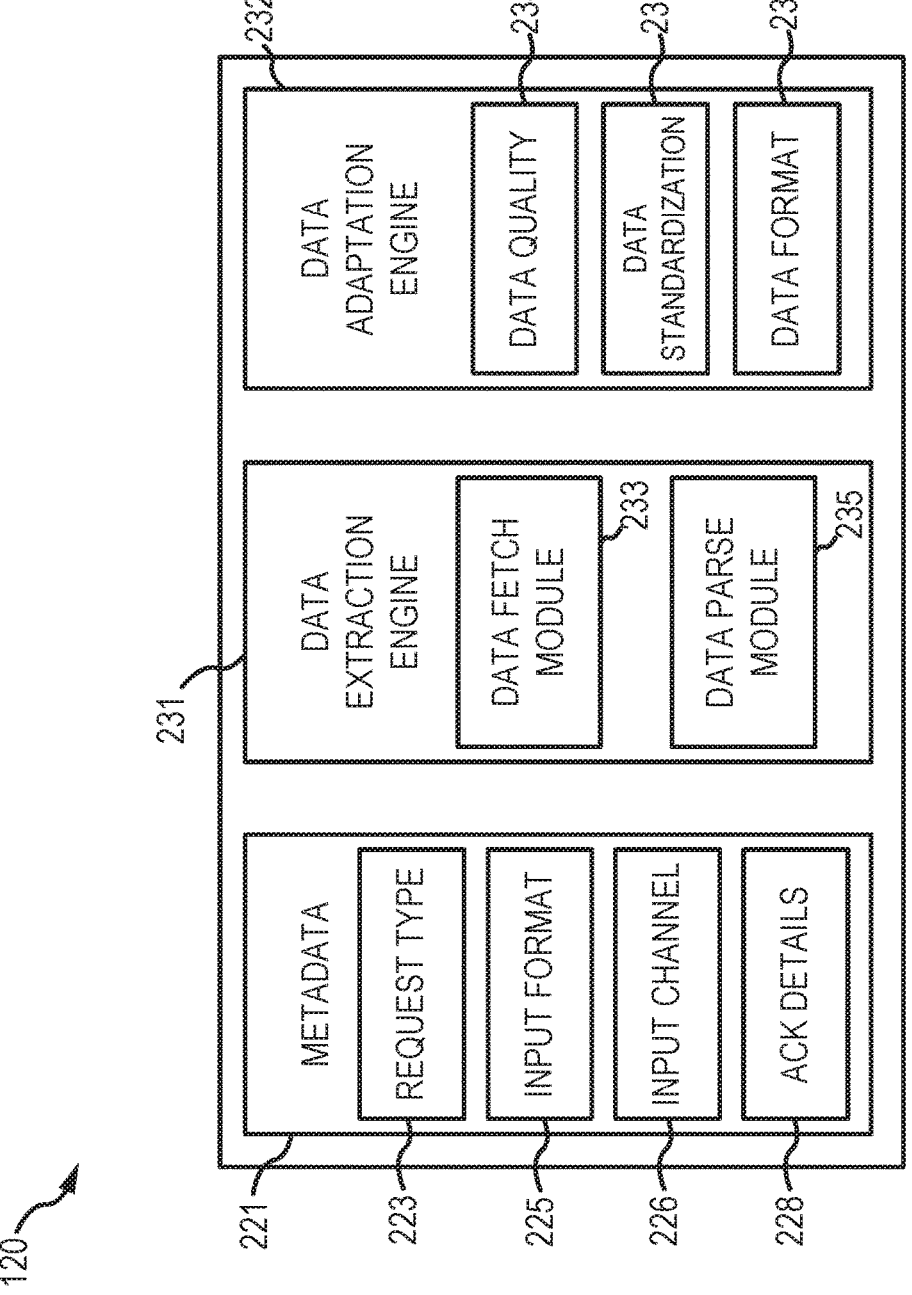
FIG. 2 is a block diagram illustrating various components of an exemplary data adapter for a system for automated data extraction and adaptation, in accordance with various embodiments.

In various embodiments, data adapter 120 may comprise various software and/or hardware components configured to aid data adapter 120 in extracting and adapting the data inputs. For example, and with reference to FIG. 2, an exemplary data adapter 120 may comprise one or more of a metadata storage 221, a data extraction engine 231, and/or a data adaptation engine 232.

Metadata storage 221 may be configured to store and maintain metadata and information corresponding to data inputs received from external sources. In various embodiments, during onboarding of an external source into system 100, the external source may provide details regarding how the data inputs will be transmitted into system 100. For example, metadata storage 221 may store known metadata such as a request type 223, an input format 225, an input channel 226, acknowledgement details 228, and the like. The known metadata stored in metadata storage 221 may be provided by the external sources during an onboarding process, and/or may be identified and stored by machine learning system 140, as discussed further herein. Request type 223 may comprise data regarding the type of data input transmitted to the system such as, for example, transaction data, merchant data, or the like. Input format 225 may comprise data regarding the format of various data inputs transmitted into the system such as, for example, one or more data fields contained in the provided format. Input channel 226 may define the various input channels 101 available in the system such as, for example, input channels 102, 103, 104, 105, 106, 107, 108, 109. Acknowledgement details 228 may comprise data regarding the presence, content, context, and characteristics of the acknowledgement that needs to be sent for the data input received from an input channel 101 (e.g., as submitted by an external source, partner, etc.). In various embodiments, acknowledgment details 228 may be configured to provide data at a granular level (e.g., for each external source submitting data inputs, for each input channel 101, etc.). Acknowledgement details 228 may include, for example, whether an acknowledgement of receipt is needed by an external source, an acknowledgement channel to return the acknowledgement (e.g., file feed, REST response, etc.), the service level agreement (SLA) for an acknowledgement, the fields to include in an acknowledgement, and/or the like.

Data extraction engine 231 may be configured to receive data inputs from the input channels and parse the data inputs to determine the data fields in each data input. For example, data extraction engine 231 may comprise a data fetch module 233 and a data parse module 235. Data fetch module 233 may be configured to receive (or retrieve) the data inputs from the input channels 101 (e.g., directly or via the connector modules). Data parse module 235 may be configured to parse the data inputs received by data fetch module 233, and to determine the various data fields contained in each data input, as discussed further herein.

Data adaptation engine 232 may be configured to determine the data quality of data inputs received by data extraction engine 231, and to standardize and format the data inputs into a standard format consumable by application layer services 180. Data adaptation engine 232 may comprise a data quality module 234, a data standardization module 236, and/or a data formatting module 238. Data quality module 234 may be configured to determine the data quality of the data input. Data quality module 234 may determine the data quality of the data input by comparing the data input to known metadata in the system (e.g., from metadata storage 221). For example, data quality module 234 may compare the parsed data input to the known metadata to determine whether the data input is being received from an external source previously registered with the system, and in a format and quality previously established and known in the system. For example, data quality module 234 may compare the parsed data fields from the data input to the known metadata to determine whether each data field in the data input is known. In response to determining that each data field is known in the system, data quality module 234 may proceed with processing the data input, as discussed further herein. In response to determining that one or more data fields are not known in the system, data quality module 234 may invoke machine learning system 140 to aid in identifying the unknown data fields, as discussed further herein.

Data standardization module 236 and data formatting module 238 may standardize and reformat the parsed data input into a format that is consumable by machine learning system 140 and/or application layer services 180. For example, a standardized format may comprise the data fields of a specific data input type in a defined order. Based on the known metadata matched by data quality module 234, data standardization module 236 may determine the standard format to reformat the data input into (e.g., based on the input format metadata 225). Data formatting module 238 may reformat the data input such as, for example, by moving one or more data fields to comply with the standardized format.

With reference again to FIG. 1, data adapter 120 may transmit and store the standardized data inputs in local database 175. Local database 175 may store the data inputs using any suitable technique. In various embodiments, data processor 170 may be configured to query and retrieve the data inputs from local database 175, route data inputs for manual review, and/or the like. For example, and in accordance with various embodiments, data processor 170 may be configured to retrieve and process the data inputs, and transform the data inputs into a format usable by one or more consumer applications (e.g., application layer services 180). For example, data processor 170 may perform various transformation operations such as data aggregation, data augmentation, data encryption, balancing and control operations, and/or the like. Data processor 170 may comprise one or more network environments, servers, computer-based systems, processors, databases, and/or the like. Data processor 170 may comprise at least one computing device in the form of a computer or processor, or a set of computers/processors, although other types of computing units or systems may be used such as, for example, a server, web server, pooled servers, or the like. Data processor 170 may also include software, such as services, APIs, and the like, configured to perform various operations discussed herein.

In various embodiments, machine learning system 140 may be in electronic communication with data adapter 120, one or more data input channels 101, and/or business intelligence system 160. Machine learning system 140 may be configured to ingest data inputs from data adapter 120 and provide various machine learning, artificial intelligence, statistical modeling, or the like capabilities, as discussed further herein. Machine learning system 140 may comprise any suitable combination of hardware, software, and/or database components. For example, machine learning system 140 may comprise one or more network environments, servers, computer-based systems, processors, databases, and/or the like. Machine learning system 140 may comprise at least one computing device in the form of a computer or processor, or a set of computers/processors, although other types of computing units or systems may be used such as, for example, a server, web server, pooled servers, or the like. Machine learning system 140 may also include one or more data centers, cloud storages, or the like, and may include software, such as APIs, services, or the like, configured to perform various operations discussed herein. In various embodiments, machine learning system 140 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Figure 3:
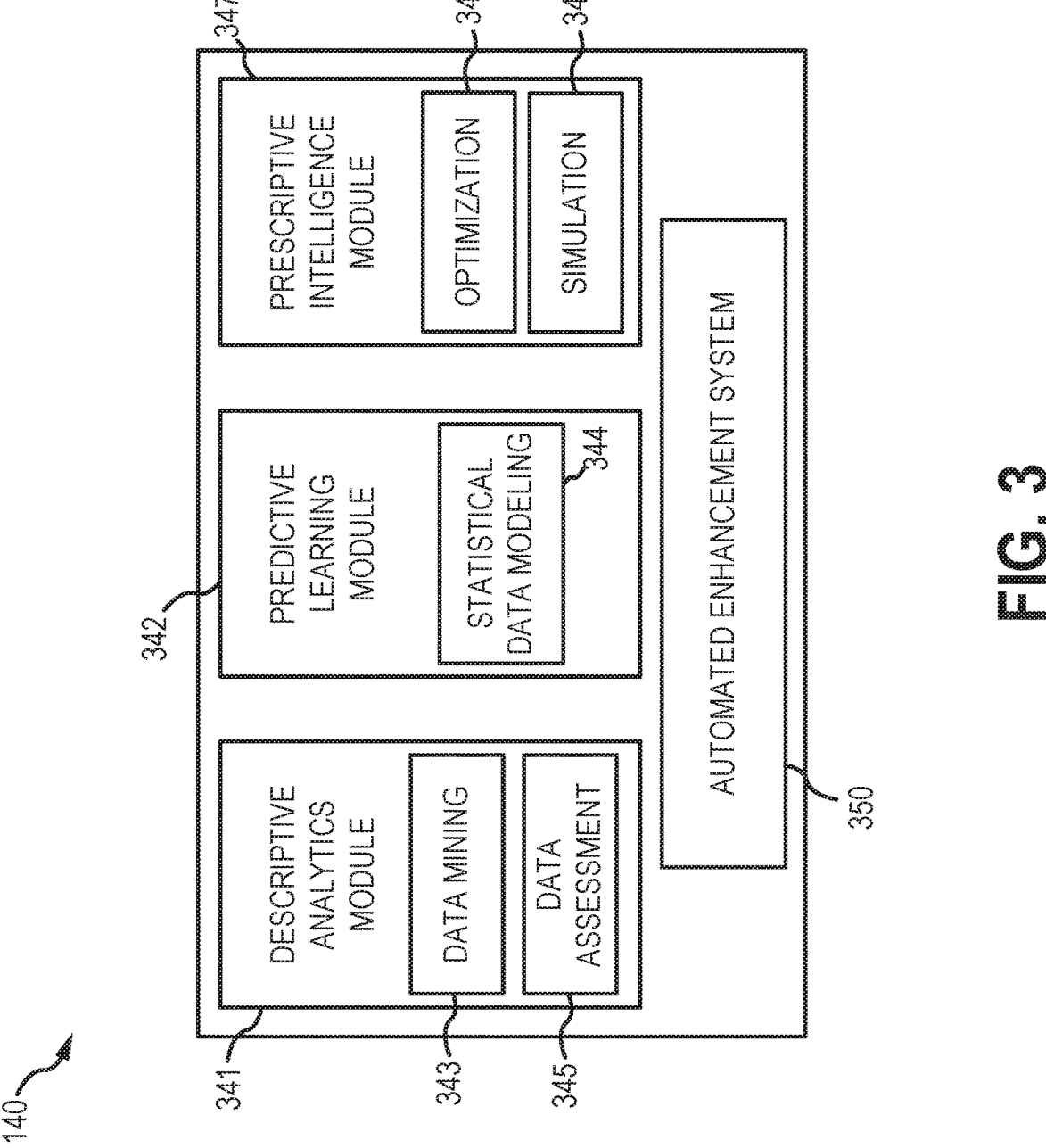
FIG. 3 is a block diagram illustrating various components of an exemplary machine learning system for a system for automated data extraction and adaptation, in accordance with various embodiments.

In various embodiments, machine learning system 140 may comprise various software and/or hardware components configured to aid machine learning system 140 in performing various machine learning, artificial intelligence, statistical modeling, or the like capabilities. For example, and with reference to FIG. 3, an exemplary machine learning system 140 may comprise one or more of a descriptive analytics module 341, a predictive learning module 342, a prescriptive intelligence module 347, and/or an automated enhancement system 350. Descriptive analytics module 341, predictive learning module 342, prescriptive intelligence module 347, and/or automated enhancement system 350 may each comprise any suitable machine learning model or algorithm, statistical data model, or the like, and may be supervised or unsupervised. For example, exemplary unsupervised models may include clustering and dimensionality reduction, LDA topic modeling, and/or any other unsupervised machine learning model. For example, exemplary supervised models may include classification models, regression models, sentiment analysis techniques, and/or any other supervised machine learning model.

Descriptive analytics module 341 may be configured to implement data assessment and data mining functionalities to provide insights into the received data inputs. For example, descriptive analytics module 341 may comprise a data mining module 343 and/or a data assessment module 345. Data mining module 343 and/or data assessment module 345 may perform a descriptive analytics analysis to leverage data mining and assessment functionalities to provide insights into the known data qualities and features contained in the parsed data input. For example, descriptive analytics module 341 may generate a descriptive analytics output in response to one or more data fields of the data input being determined to include known metadata from metadata storage 221. In various embodiments, the data mining may aid in determining data characteristics, metrics, and events that have occurred with various data inputs that cause an error or degradation in system performance. This mined data may then be used to improve the input channels 101.

Predictive learning module 342 may be configured to implement statistical models and techniques to provide insights into the received data inputs. Predictive learning module 342 may comprise a statistical data modeling module 344 configured to perform a predictive learning analysis. The predictive learning analysis may implement statistical models and techniques, or the like, to assess and identify new data inputs and data fields that comprise unrecognized metadata, structure, format, or the like. In that respect, the predictive learning output may identify new data qualities, features, and/or metadata to be used by data adapter 120 in future analysis of data inputs. For example, predictive learning module 342 may generate a predictive learning output by assessing the data input to determine a data field of the data input that is not included in the known metadata from metadata storage 221. The assessment may be completed using any suitable machine learning model or algorithm, statistical data model, or the like, and may be supervised or unsupervised. In response to generating the predictive learning output, machine learning system 140 may transmit the predictive learning output to data adapter 120. Data adapter 120 may update metadata storage 221 to include the predictive learning output (e.g., the new metadata).

Prescriptive intelligence module 347 may be configured to ingest output from descriptive analytics module 341 and predictive learning module 342 to provide optimization and simulation functionalities to enhance system processes. Prescriptive intelligence module 347 may comprise an optimization module 348 and a simulation module 349. Optimization module 348 and simulation module 349 may be configured to perform a prescriptive intelligence analysis. The prescriptive intelligence analysis may ingest the outputs from the descriptive analytics analysis and the predictive learning analysis, and run the outputs through optimization and simulation algorithms to produce a predictive learning output. In various embodiments, the prescriptive analytics analysis may thus aid in modeling brand new types of data inputs and understanding more about the characteristics and features of data inputs that has not yet been discovered. In various embodiments, the prescriptive analytics analysis may also be used to simulate new types of data inputs to ensure compatibility with the system.

In various embodiments, automated enhancement system 350 may be configured to provide feedback to one or more input channels 101 and/or external sources based on the outputs from descriptive analytics module 341, predictive learning module 342, and/or prescriptive intelligence module 347. For example, automated enhancement system 350 may transmit the outputs to the external sources associated with the input channels 101. Based on the output, the external sources may modify internal processes to transmit future data inputs into the input channels 101 to include the newly identified features and metadata.

With reference again to FIG. 1, business intelligence system 160 may be in electronic communication with machine learning system 140. Business intelligence system 160 may be configured to provide various natural language generation (NLG) functionalities and recommendation messages based on output from machine learning system 140. Business intelligence system 160 may include any hardware and/or software suitably configured to receive output from machine learning system 140 and generate natural language recommendation messages, as discussed further herein. For example, business intelligence system 160 may comprise a computer-based system, server, processor, or the like. NLG components and software are commercially available and known in the art. Business intelligence system 160 may be implemented through commercially available hardware and/ or software, through custom hardware and/or software components, or through a combination thereof. In various embodiments, the recommendation message may comprise any suitable data, such as for example, key patterns or trends detects in the system. The recommendation messages may be transmitted for manual review (e.g., to a business stakeholder), and/or may be transmitted to downstream systems such as, for example, sales system, customer relationship management (CRM) systems, or the like.

In various embodiments, application layer services 180 may enable various entities, systems, applications, processes, or the like to interact with data inputs stored in local database 175. Application layer services 180 may comprise any system, application, process, entity, or the like desiring to consume one or more data inputs. For example, and in accordance with various embodiments, application layer services may include merchant setup 182, merchant servicing 184, complaints 186, data requests 188, and/or the like. In various embodiments, application layer services 180 may consume the stored data inputs as part of a compliance process for know your customer (KYC) regulations, financial risk ratings, anti-money laundering laws, and similar legal requirements. Application layer services 180 may comprise one or more hardware, software, and/or database components. Application layer services 180 may comprise an API, web service, or the like configured to provide the data inputs to data consumers. In various embodiments, application layer services 180 may comprise a message queue or the like to route data inputs from data adapter 120 and/or local database 175 to one or more services or data consumers.

Referring now to FIG. 4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIG. 4, but also to the various system components as described above with reference to FIGS. 1-3. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings described below. Unless otherwise specifically noted, articles depicted in the drawings are not necessarily drawn to scale.

With specific reference to FIG. 4, a process 401 for extracting and adapting data inputs from varying data channels is disclosed. Process 401 may include receiving a data input (step 402) from an input channel 101. The data input may comprise one or more data fields. For example, in response to the data input comprising merchant data, the data input may comprise data fields including merchant name, merchant ID, merchant tax ID, merchant address, and the like. Data inputs may be received having varying data structures (e.g., structured, unstructured, etc.) and formats based on the input channel 101 and/or the external source transmitting the data input.

The data input may be received by data adapter 120 (e.g., via data fetch module 233 of data extraction engine 231) using one or more connector components. For example, wherein the input channel 101 comprises an API input 102, a web service input 103, a web portal input 104, and/or a file feed input 105, the data input may be received by data adapter 120 using middleware 112. As a further example, wherein the input channel 101 comprises a physical document input 106 the data input may be received by data adapter 120 using optical character recognition (OCR) 114. As a further example, wherein the input channel 101 comprises a speech input 107 and/or a text input 108, the data input may be received by data adapter 120 using a gateway 116 and/or a natural language processing (NLP) module 115. As a further example, wherein the input channel 101 comprises an email input 109, the data input may be received by data adapter 120 using an email webhook 118 and/or the NLP module 115.

Process 401 may include parsing the data input (step 404). Data adapter 120 (e.g., via data parse module 235 of data extraction engine 231) may be configured to parse the data input to determine one or more of the data fields contained in the data input.

Process 401 may include determining a data quality of the data input (step 406). Data adapter 120 (e.g., via data quality module 234 of data adaptation engine 232) may determine the data quality of the data input by comparing the data input to known metadata in the system (e.g., from metadata storage 221). Known metadata in the system may comprise request type 223, input format 225, input channel 226, acknowledgement details 228, or any other suitable or desired metadata. The known metadata stored in metadata storage 221 may be provided by the external sources during an onboarding process, and/or may be identified and stored by machine learning system 140, as discussed further herein. Request type 223 may comprise data regarding the type of data input transmitted to the system such as, for example, transaction data, merchant data, or the like. Input format 225 may comprise data regarding the format of various data inputs transmitted into the system such as, for example, one or more data fields contained in the provided format. Input channel 226 may define the various input channels 101 available in the system such as, for example, input channels 102, 103, 104, 105, 106, 107, 108, 109. Acknowledgement details 228 may comprise data regarding the presence, content, context, and characteristics of the acknowledgement that needs to be sent for the data input received from an input channel 101 (e.g., as submitted by an external source, partner, etc.). In various embodiments, acknowledgment details 228 may be configured to provide data at a granular level (e.g., for each external source submitting data inputs, for each input channel 101, etc.). Acknowledgement details 228 may include, for example, whether an acknowledgement of receipt is needed by an external source, an acknowledgement channel to return the acknowledgement (e.g., file feed, REST response, etc.), the service level agreement (SLA) for an acknowledgement, the fields to include in an acknowledgement, and/or the like.

In that regard, data adapter 120 may compare the parsed data input to the known metadata to determine whether the data input is being received from an external source previously registered with the system, and in a format and quality previously established and known in the system. For example, data adapter 120 may compare the parsed data fields from the data input to the known metadata to determine whether each data field in the data input is known. In response to determining that each data field is known in the system, data adapter 120 may proceed with processing the data input. In response to determining that one or more data fields are not known in the system, data adapter 120 may invoke machine learning system 140 (e.g., as discussed in step 410).

Process 401 includes standardizing and formatting the parsed data input (step 408). For example, data adapter 120 (via data standardization module 236 and/or data formatting module 238 of data adaptation engine 232) may standardize and reformat the parsed data input into a format that is consumable by machine learning system 140 and/or application layer service. For example, a standardized format may comprise the data fields of a specific data input type in a defined order. Based on the known metadata matched in step 406, data adapter 120 may reformat the data input by moving one or more data fields to comply with the standardized format. In response to standardizing and reformatting the data input, data adapter 120 stores the standardized data input in local database 175.

Process 401 may include invoking machine learning system 140 (step 410). For example, data adapter 120 may invoke machine learning system 140 by transmitting the data input to machine learning system 140. Data adapter 120 may also transmit details regarding the data quality of the data input such as, for example, whether any data fields parsed from the data input were not matched with known metadata in the system (e.g., in metadata storage 221).

In response to being invoked, process 401 may include machine learning system 140 generating a machine learning analysis output (step 412). Machine learning system 140 may generate the machine learning analysis output using one or more of a descriptive analytics analysis, a predictive learning analysis, and/or a prescriptive intelligence analysis. Machine learning system 140 (via descriptive analytics module 341) may be configured to perform the descriptive analytics analysis. The descriptive analytics analysis may leverage data mining and assessment functionalities to provide insights into the known data qualities and features contained in the parsed data input. For example, machine learning system 140 may generate a descriptive analytics output in response to one or more data fields of the data input being determined to include known metadata (e.g., as determined in step 406). In various embodiments, a descriptive analytics output may include insights into the analyzed data inputs, such as, for example, trends, causal events, correlated events, and/or the like.

Machine learning system 140 (via predictive learning module 342) may be configured to perform the predictive learning analysis. The predictive learning analysis may implement statistical models and techniques, or the like, to assess and identify new data inputs and data fields that comprise unrecognized metadata, structure, format, or the like. In that respect, the predictive learning output may identify new data qualities, features, and/or metadata to be used by data adapter 120 in future analysis of data inputs. For example, machine learning system 140 may generate a predictive learning output by assessing the data input to determine a data field of the data input that is not included in the known metadata. The assessment may be completed using any suitable machine learning model or algorithm, statistical data model, or the like, and may be supervised or unsupervised.

In response to generating the predictive learning output, process 401 may also include updating data adapter 120 based on the output (step 414). For example, machine learning system 140 may transmit the predictive learning output to data adapter 120. Data adapter 120 may update metadata storage 221 to include the predictive learning output.

With reference again to step 412 of process 401, machine learning system 140 (via prescriptive intelligence module 347) may be configured to perform the prescriptive intelligence analysis. The prescriptive intelligence analysis may ingest the outputs from the descriptive analytics analysis and the predictive learning analysis, and run the outputs through optimization and simulation algorithms to produce a predictive learning output. For example, machine learning system 140 may generate the predictive learning output based on the descriptive analytics output and the predictive learning output. In various embodiments, the prescriptive intelligence analysis may aid in modeling new types of data inputs into the system, and understanding unknown characteristics and features of existing data inputs. In various embodiments, the prescriptive intelligence analysis may also simulate new types of data inputs into the system.

In response to completing generation of the machine learning analysis output (e.g., the descriptive analytics output, the predictive learning output, and the prescriptive intelligence output), process 401 may include generating a recommendation message based on the output (step 416).

Machine learning system 140 may transmit the machine learning analysis output to business intelligence system 160. Business intelligence system 160 may ingest the machine learning analysis output to generate the recommendation message. For example, business intelligence system 160 may generate the recommendation message by processing the machine learning analysis output through a natural language generation (NLG) algorithm. For example, the recommendation message may provide insight into the data inputs being received into the system. In various embodiments, the recommendation message may comprise any suitable data, such as for example, key patterns or trends detected in the system. The recommendation messages may be transmitted for manual review (e.g., to a business stakeholder), and/or may be transmitted to downstream systems such as, for example, sales system, customer relationship management (CRM) systems, or the like.

In response to completing generation of the machine learning analysis output (e.g., the descriptive analytics output, the predictive learning output, and the prescriptive intelligence output), process 401 may also include enhancing the input channels 101 based on the output (step 418). For example, machine learning system 140 (via automated enhancement system 350) may transmit the predictive learning output to external sources associated with the input channels 101. Based on the predictive learning output, the external sources may modify future data inputs into the input channels 101 to include the newly identified features and metadata.

In various embodiments, process 401 may include application layer services 180 consuming the stored data input (step 420). For example, one or more application layer services 180 (e.g., merchant setup 182, merchant servicing 184, complaints 186, data request 188, etc.) may interact with the stored data inputs. In various embodiments, application layer services 180 may consume the stored data inputs as part of a compliance process for know your customer (KYC) regulations, financial risk ratings, anti-money laundering laws, and similar legal requirements.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment.

Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOU-TUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS' applications but have been combined for simplicity.

In various embodiments, components, modules, and/or engines of system 100, or one or more subcomponents of system 100, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S.

application Ser. No. 15/785,843 titled MESSAGING BAL-ANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIB-UTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a data-base merge function, for example, using a "key field" in pre-selected databases or data sectors. Various database tuning steps are contemplated to optimize database perfor-mance. For example, frequently used files such as indexes may be placed on separate file systems to reduce In/Out ("I/O") bottlenecks.

More particularly, a "key field" partitions the database according to the high-level class of objects defined by the key field. For example, certain types of data may be desig-nated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal com-pression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or tech-niques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, trans-action/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Further-more, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the stand-alone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in system 100, including in one or more databases, may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPE"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a computer-based system, the method comprising:

in response to a computer-based system determining that a format of a data input from an external source is unknown based on a comparison of the format of the data input to a format of a data structure in a database, the method further comprises:

generating a predicted format for the data input using one or more machine learning models that have been trained on the data structure;

reformatting the data input to generate a reformatted data input based on the predicted format, wherein the reformatted data input comprises a standardized format comprising data fields of a specific data input type in a defined order;

storing the reformatted data input in the database;

training each of the one or more machine learning models with the reformatted data input;

moving one or more data fields of the data input to comply with the standardized format;

generating a machine learning analysis output;

in response to the machine learning analysis output, transmitting the machine learning analysis output to the external source associated with the input channel to cause the external source to enhance future data inputs into the input channel; and receiving an enhanced data input from the external source, wherein the enhanced data input was generated using the machine learning analysis output.

2. The method of claim 1, wherein the generating the machine learning analysis output further comprises:

generating, by the computer-based system, a descriptive analytics output in response to a first data field of the data input corresponding to the format of the data structure;

assessing, by the computer-based system, the data input using a predictive learning analysis to determine a second data field of the data input that is not included in the format of the data structure; and generating, by the computer-based system, the machine learning analysis output using a prescriptive intelligence analysis based on the descriptive analytics output and the predictive learning analysis.

3. The method of claim 2, further comprising:

enhancing, by the computer-based system, the input channel based on the machine learning analysis output.

4. The method of claim 2, further comprising:

generating, by the computer-based system, a recommendation message based on the machine learning analysis output.

5. The method of claim 1, wherein the input channel comprises at least one of:

an API input, a web service input, a web portal input, or a file feed input, and wherein the data input is received using middleware.

6. The method of claim 1, wherein the input channel comprises a physical document input, and wherein the data input is received using optical character recognition (OCR).

7. The method of claim 1, wherein the input channel comprises at least one of:

a speech input or a text input, and wherein the data input is received using at least one of a gateway or a natural language processing (NLP) module.

8. The method of claim 7, wherein the input channel comprises an email input, and the data input is received using at least one email webhook or the NLP module.

9. The method of claim 1, wherein the data input comprises at least one of:

transaction data or merchant data, and wherein the reformatted data input is consumed to comply with a know your customer (KYC) regulation, a financial risk rating, an anti-money laundering law, or a financial legal requirement.

10. A system comprising:

a processor; and a non-transitory memory having instructions stored thereon that, in response to execution by the processor, configure the processor to:

in response to a determination that a format of a data input from an external source is unknown based on a comparison of the format of the data input to a format of a data structure in a database, the instructions further configure the processor to:

generate a predicted format for the data input using one or more machine learning models that have been trained on the data structure;

reformat the data input to generate a reformatted data input based on the predicted format, wherein the reformatted data input comprises a standardized format comprising data fields of a specific data input type in a defined order;

store the reformatted data input in the database;

train each of the one or more machine learning models with the reformatted data input;

move one or more data fields of the data input to comply with the standardized format;

generate a machine learning analysis output;

in response to the machine learning analysis output, transmit the machine learning analysis output to the external source associated with the input channel to cause the external source to enhance future data inputs into the input channel; and receive an enhanced data input from the external source, wherein the enhanced data input was generated using the machine learning analysis output.

11. The system of claim 10, wherein the processor generates the machine learning analysis output, the processor is further configured to:

generate a descriptive analytics output in response to a first data field of the data input that corresponds to the format of a data structure;

assess the data input via a predictive learning analysis to determine a second data field of the data input that is not included in the format of a data structure; and generate the machine learning analysis output via the prescriptive intelligence analysis based on the descriptive analytics output and the predictive learning analysis.

12. The system of claim 11, where the instructions further configure the processor to:

enhance the input channel based on the machine learning analysis output; and generate a recommendation message based on the machine learning analysis output.

13. The system of claim 10, wherein the input channel comprises at least one of:

an API input, a web service input, a web portal input, or a file feed input, and wherein the data input is received using middleware.

14. The system of claim 10, wherein the input channel comprises a physical document input, and wherein the data input is received via optical character recognition (OCR).

15. The system of claim 10, wherein the input channel comprises at least one of:

a speech input or a text input, and wherein the data input is received via at least one of a gateway or a natural language processing (NLP) module.

16. The system of claim 10, wherein the input channel comprises an email input, and wherein the data input is received via at least one of an email webhook or the NLP module.

17. An article of manufacture including a non-transitory, tangible computer-readable storage medium having instructions stored thereon that, in response to execution by a computer-based system, cause the computer-based system to perform operations comprising:

in response to the computer-based system determining that a format of a data input from an external source is unknown based on a comparison of the format of the data input to a format of a data structure in a database, the computer-based system further performs:

generating a predicted format for the data input using one or more machine learning models that have been trained on the data structure;

reformatting the data input to generate a reformatted data input based on the predicted format, wherein the reformatted data input comprises a standardized format comprising data fields of a specific data input type in a defined order;

storing the reformatted data input in the database;

training each of the one or more machine learning models with the reformatted data input;

moving one or more data fields of the data input to comply with the standardized format;

generating a machine learning analysis output;

in response to the machine learning analysis output, transmitting the machine learning analysis output to the external source associated with the input channel to cause the external source to enhance future data inputs into the input channel; and receiving an enhanced data input from the external source, wherein the enhanced data input was generated using the machine learning analysis output.

18. The article of manufacture of claim 17, wherein the input channel comprises at least one of:

an API input, a web service input, a web portal input, or a file feed input, and wherein the data input is received using middleware.

19. The article of manufacture of claim 17, wherein the input channel comprises a physical document input, and wherein the data input is received using optical character recognition (OCR).

20. The article of manufacture of claim 17, wherein the input channel comprises at least one of:

a speech input or a text input, and wherein the data input is received using at least one of a gateway or a natural language processing (NLP) module.

* * * * *